US006540453B1

(12) United States Patent
Lübcke

(10) Patent No.: US 6,540,453 B1
(45) Date of Patent: Apr. 1, 2003

(54) METHOD FOR POSITIONING ENGRAVING MEMBERS

(75) Inventor: Bernd Lübcke, Molfsee (DE)

(73) Assignee: Hall Gravure Systems GmbH, Kiel (DE)

( * ) Notice: Subject to any disclaimer, the term of this patent is extended or adjusted under 35 U.S.C. 154(b) by 0 days.

(21) Appl. No.: 09/647,617

(22) PCT Filed: Apr. 3, 1999

(86) PCT No.: PCT/DE99/01014

§ 371 (c)(1),
(2), (4) Date: Nov. 3, 2000

(87) PCT Pub. No.: WO99/51436

PCT Pub. Date: Oct. 14, 1999

(30) Foreign Application Priority Data

Apr. 3, 1998 (DE) ........................................ 198 14 939

(51) Int. Cl.[7] ................................................ B23C 3/00
(52) U.S. Cl. ......................... 409/131; 358/3.29; 101/32
(58) Field of Search .............................. 358/3.29, 3.32, 358/406; 101/32, 401.1, 485; 409/131, 210, 218, 214, 217, 132

(56) References Cited

U.S. PATENT DOCUMENTS 4,057,838 A * 11/1977 Doelves et al. ............ 358/3.29
4,174,527 A * 11/1979 Schaefer ..................... 358/406
5,438,422 A * 8/1995 Holowko et al. .......... 358/3.29
5,492,057 A 2/1996 Bornhors, Jr. et al.
6,283,019 B1 * 9/2001 Dolves ...................... 358/3.29
6,357,976 B1 * 3/2002 Weidlich .................... 409/131

FOREIGN PATENT DOCUMENTS

EP 0 762 723 3/1997
WO WO 95/08443 3/1995

* cited by examiner

*Primary Examiner*—Daniel W. Howell
(74) *Attorney, Agent, or Firm*—Schiff Hardin & Waite

(57) ABSTRACT

In to a method and apparatus for positioning engraving elements in an electronic engraving machine for engraving printing cylinders for rotogravure, at least two engraving lanes of predetermined lane widths lying side-by-side in the axial direction of the printing cylinder are engraved in the form of cups with a respectively allocated engraving element. Before engraving, the axial spacings of the engraving elements from one another must be set to the required lane widths. In order to save time, a manual rough adjustment of the axial spacings of the engraving elements is implemented first. Axial reference position marks whose axial spacings from one another correspond to the lane widths are generated in an apparatus. The engraving elements comprise axial position marks. In the rough positioning, the engraving elements are manually displaced until the position marks are in coincidence with the respectively allocated reference position marks. A fine positioning of the engraving elements occurs after the manual rough positioning.

20 Claims, 2 Drawing Sheets

METHOD FOR POSITIONING ENGRAVING MEMBERS

BACKGROUND OF THE INVENTION

The invention is in the field of electronic reproduction technology and is directed to a method for positioning engraving elements in an electronic engraving machine for engraving printing cylinders for rotogravure, whereby at least two engraving lanes lying side-by-side in an axial direction of the printing cylinder and having predetermined lane widths are engraved with a respectively allocated engraving element, and is also directed to an apparatus for generating reference position marks for the positioning of the engraving elements and to an engraving machine for the implementation of the method.

When engraving printing cylinders in an electronic engraving machine, an engraving element moves along a rotating printing cylinder in the axial direction. The engraving element is designed; for example, as an electromagnetic engraving element with an engraving stylus as a cutting tool. The engraving stylus controlled by an engraving control signal cuts a sequence of cups of different depth arranged in an engraving raster into the generated surface of the printing cylinder. The engraving control signal is formed by superimposition of an image signal that represents the gradations to be engraved between "light" (white) and "dark" (black) with a periodic raster signal. Whereas the periodic raster signal effects a vibrating lifting motion of the engraving stylus for producing the engraving raster, the image signal values determine the depths of the cups engraved into the generated surface of the printing cylinder and, thus, the engraved gradations.

For magazine printing, a plurality of stripe-shaped cylinder regions—called engraving lanes—that lie axially next to one another must often be engraved with a respective engraving element, for example the various printed pages of a print job. The engraving elements allocated to the individual engraving lanes are mounted on a shared engraving carriage that moves along the printing cylinder in the axial direction during engraving.

In order to achieve a good reproduction quality, the axial spacings of the engraving stylus tips of the engraving elements must be set with exact registration onto the required widths of the individual engraving lanes by axial displacement of the engraving elements on the engraving carriage. Subsequently, the engraving carriage with the exactly spaced engraving elements is positioned relative to the printing cylinder such that the engraving stylus tips lie at the axial start position for engraving the engraving lanes.

In order to save time in the exactly registered alignment of the individual engraving elements, an operator first roughly sets the required axial spacings by manual displacement of the engraving elements, for example on the basis of position marks or with the assistance of a measuring tape. The manual rough positioning of the engraving elements saves time, particularly a great number of engraving lanes are to be engraved and, thus, a great number of engraving elements must be positioned. The rough positioning is followed by the exactly registered fine positioning of the engraving elements according to various methods.

SUMMARY OF THE INVENTION

An object of the present invention is to specify a method for positioning engraving elements in an electronic engraving machine, an apparatus for generating and displaying reference position marks for the positioning of the engraving elements, as well as an engraving machine for the implementation of the method with which the positioning of engraving elements is facilitated and implemented in the shortest time.

According to the method and system of the present invention for positioning engraving elements in an electronic engraving machine for engraving printing cylinders for rotogravure, at least two engraving lanes having a predetermined lane width lying side-by-side in an axial direction of the engraving cylinder are respectively engraved in the form of cups with a respectively allocated engraving element. Axial spacings of the engraving elements relative to one another before the engraving are set. The engraving elements execute an axial feed motion along the printing cylinder during engraving. For approximately setting the axial spacings of the engraving elements to the lane widths, reference position marks are generated for the engraving elements, the axial spacings of the marks from one another corresponding to the prescribed lane widths of the engraving lanes to be engraved on a printing cylinder. The engraving elements have axial position marks. The engraving elements are axially shifted such that the position marks are in coincidence with the respectively allocated reference position marks.

Advantageous developments and embodiments are recited in the subclaims.

The invention is explained in greater detail below on the basis of FIGS. 1 and 2.

DESCRIPTION OF THE PREFERRED EMBODIMENTS

Figure 1:
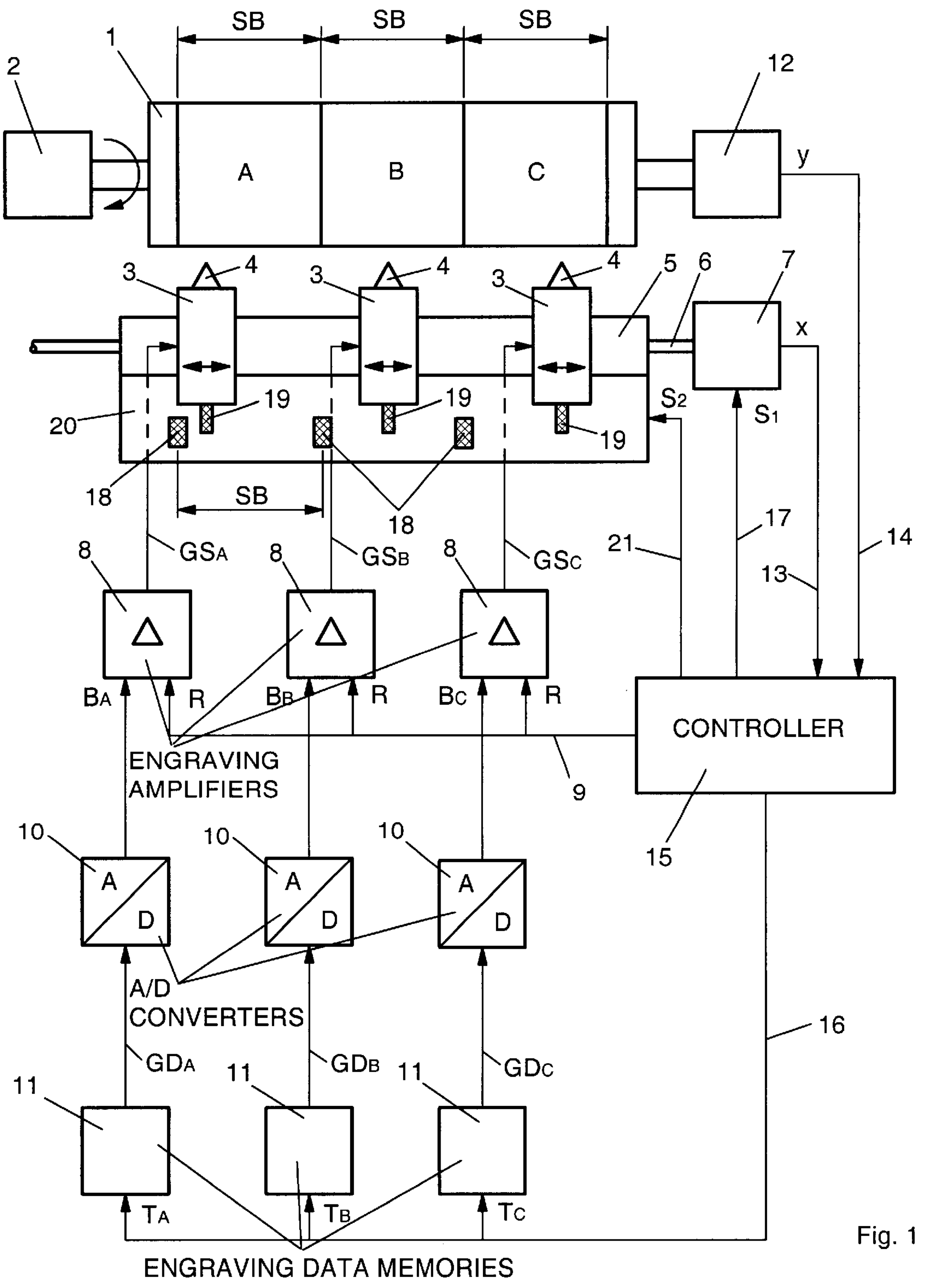
FIG. 1 is a schematic block circuit diagram of an engraving machine for printing cylinders.

FIG. 1 shows a schematic block circuit diagram of an engraving machine for engraving printing cylinders for rotogravure. The engraving machine is, for example, a HelioKlischograph® of Hell Gravure Systems GmbH, Kiel, DE.

A printing cylinder 1 is rotationally driven by a cylinder drive 2. A plurality of engraving lanes lying side-by-side in the axial direction of the printing cylinder 1 are to be engraved with a respectively allocated engraving element 3 on the printing cylinder 1, namely three engraving lanes (A, B, C) in the exemplary embodiment that exhibit identical axial lane widths (SB).

The engraving elements 3 that, for example, are fashioned as electromagnetic engraving elements having engraving styli 4 as cutting tools are located on an engraving carriage 5 on which they can be manually displaced and locked in axial direction of the printing cylinder 1. For the axial positioning of the engraving carriage relative to the printing cylinder 1 and for forward feed of the engraving carriage 5 in the axial direction during the engraving, this is moved in the axial direction of the printing cylinder 1 by an engraving carriage drive 7 via a spindle 6. The engraving elements 3 can also be individually coupled to the spindles (6) with spindle nuts. In this case, the shared engraving carriage 5 is omitted.

The engraving styli 4 of the engraving elements 3 cut a series of cups arranged in a printing raster into the generated surface of the rotating printing cylinder 1 engraving line by engraving line while the engraving carriage 5 together with the engraving elements 3 moves along the printing cylinder 1 in the feed the direction.

The engraving of the cups in the illustrated exemplary embodiment occurs on individual engraving lines proceeding circularly in the circumferential direction around the printing cylinder 1, whereby the engraving carriage 5 executes an axial feed step to the next engraving line after respectively engraving the cups on one engraving line.

Such an engraving method is disclosed, for example in U.S. Pat. No. 4,013,829. Alternatively, the engraving of the engraving lanes (A, B, C) can also occur in an engraving line helically proceeding around the printing cylinder 1, whereby the engraving carriage 5 then executes a continuous feed motion during the engraving.

The engraving styli 4 of the engraving elements 3 are controlled by engraving control signals (GS). The engraving control signals (GS) are formed in engraving amplifiers 8 from the superimposition of a periodic raster signal (R) on a line 9 with image signal values (B) that represent the gradations of the cups to be engraved between "light" (white) and "dark" (black). Whereas the periodic raster signal (R) effects a vibrating lifting motion of the engraving styli 4 for producing the engraving raster, the image signal values (B) determine the respective geometrical dimensions according to the gradations to be engraved, for example penetration depth, transverse diagonal and longitudinal diagonal of the cups engraved into the generated surface of the printing cylinder 1.

The analog image signal values (B) are acquired in D/A converters 10 from engraving data (GD) that are stored in engraving data memories 11 and are read out therefrom engraving line by engraving line and are supplied to the D/A converters 10. An engraving datum of at least one byte is thereby allocated to each engraving location for a cup on the printing cylinder 1, this containing, among other things, the gradation between "light" and "dark" to be engraved as engraving information.

The engraving locations for the cups predetermined by the engraving raster are defined by location coordinates (x, y) of a XY-coordinate system allocated to the printing cylinder 1 whose Y-axis is oriented in the circumferential direction (engraving direction) of the printing cylinder 1 and whose X-axis is oriented in the axial direction of the printing cylinder 1 feed direction.

The engraving carriage drive 7 generates the x-location coordinates in the feed direction that define,the axial positions of the engraving carriage 5 relative to the printing cylinder 1. A position sensor 12 mechanically coupled to the printing cylinder 1 generates the corresponding y-location coordinates in the engraving direction. The location coordinates (x, y) are supplied via lines 13, 14 to a controller 15 that controls the engraving sequence.

The controller 15 generates three read clock sequences (T) on a multiple line 16 for the readout of the engraving data (GD) from the engraving data memories 11, a feed command $S_1$ on a linet 17 to the engraving carriage drive 7 for controlling the step-by-step feed of the engraving carriage 5 and generates the raster (R) on the line 9.

The frequency of the raster signal (R) together with the circumferential speed of the printing cylinder 1 and the axial feed step width of the engraving carriage 5 define the geometry of the engraving raster with respect to screen angle and screen width.

In order to achieve a registration-exact engraving of the engraving lanes (A, B, C) on the printing cylinder 1, the axial spacings between the engraving styli 4 of the engraving elements 3 must be set such that they correspond to the predetermined lane widths (SB).

For that purpose, a rough positioning of the engraving elements 3 to the approximate lane widths (SB) occurs first in practice by manual, axial displacement of the engraving elements 3 on the engraving carriage 5 by an operator. Subsequently, a fine positioning of the engraving styli 4 of the engraving elements 3 is implemented under visual observation by the operator. The fine positioning occurs, for example, with the assistance of a specific microscope unit (stylus allocation gauge) and of manually actuatable spindle drives on the engraving carriage 5.

Alternatively, to the fine positioning of the engraving elements 3, an electronic compensation of the spacing errors made in the rough positioning can occur during the engraving according to German Patent Application P 197 23 007.5.

Subsequently, the engraving carriage 5 is axially displaced such that the engraving stylus tips of the engraving elements 3 are positioned to the start engraving lines of the individual engraving lanes (A, B, C) on the printing cylinder 1, and the engraving can begin.

In order to facilitate the manual axial rough positioning of the engraving elements 3 by the operator before the engraving, axial reference position marks 18 are inventively generated dependent on the engraving parameters of "plurality of engraving lanes" and "lane width", the plurality of said reference position marks corresponding to the plurality of engraving lanes (A, B, C) to be engraved and their axial spacings from one another coinciding with the desired lane widths (SB). Corresponding position marks 19 are attached to the engraving elements 3. In the rough positioning, the operator advantageously need only bring the position marks 19 of the engraving elements 3 into coincidence with the appertaining reference position marks 18 by axial displacement of the individual engraving elements 3.

For this purpose, the engraving machine comprises an apparatus 20 for generating and displaying the reference position marks 18. The apparatus 20 has its longitudinal expanse aligned in the axial direction or, feed direction in the exemplary embodiment shown in FIG. 1 and is secured to the axially displaceable engraving carriage 5. Dependent on the predetermined engraving parameters, the apparatus 20 is actuated by a corresponding control instructions ($S_2$) on a line (21) proceeding from the controller 15.

Figure 2:
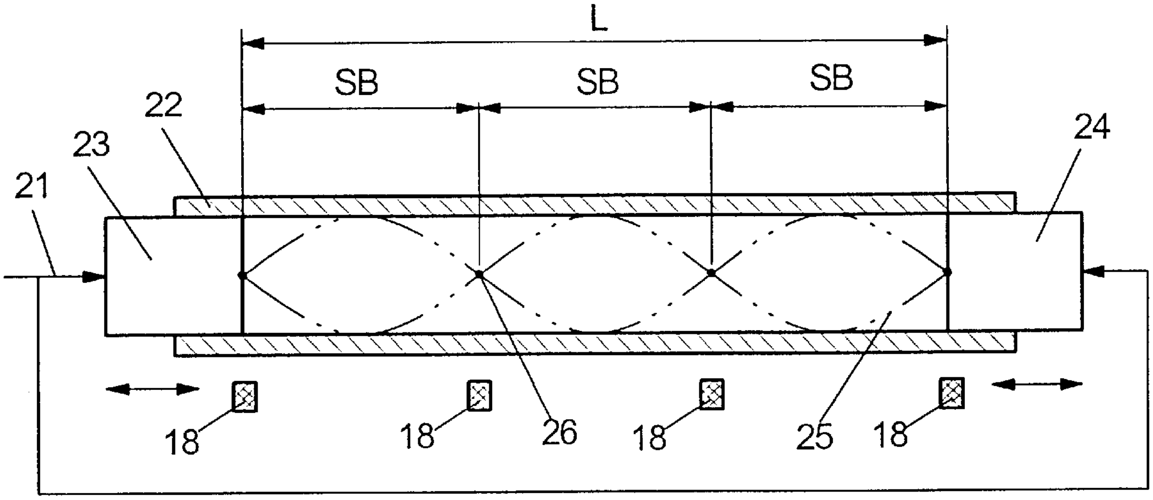
FIG. 2 is an exemplary embodiment of an apparatus for generating reference position marks.

FIG. 2 shows an exemplary embodiment of the apparatus 20 for generating and displaying the reference position marks 18, this being composed of a transparent tube 22, for example an acrylic glass tube in which optically refractive particles are located, for example non-rounded glass powder particles. A frequency-controllable sound generator 23 is secured to the one face end of the tube 22 and a light source 24 for generating visible light is secured to the other end face. The sound propagating in the glass of the tube 22, and/or in the air space of the tube 22 generates a standing acoustic wave 25 in the tube 22 with wave nodes 26, whereby the first wave node 26 lies in the region of the sound generator 23 and the last wave node lies in the region of the light source 24. Deposits of particles arise at the wave nodes 26, these being made visible from the outside with the assistance of the light source 24 as reference position marks 18. Alternatively, the glass powder can also be mixed with a fluorescent substance, whereby the light source 24 is designed as an ultraviolet light source.

The spacing of two wave nodes 26 from one another corresponds to half the wave length ($\lambda/2$) of the standing wave 25. The wave length (λ) can be modified via the frequency (f) of the standing wave 25. The spacing (L) between the end faces of the sound generator 23 and the light source 24, which amounts to a multiple of the half wave length (λ/2), can be respectively matched to the requirements by axial displacement of the sound generator 23 and/or of the light source 24.

The plurality of reference position marks 18 to be generated or the number of wave nodes 26 to be generated is equal to the number n of engraving lanes (A, B, C) to be engraved on the printing cylinder 1. The spacing of the reference position marks 18 relative to one another, which corresponds to half the wave length (λ/2), is equal to the predetermined lane width (SB) of the engraving lanes (A, B, C) to be engraved.

Given the assumption that the first and the last wave node 26 at the mutually facing end faces of the sound generator 23 and the light source 24 are used for generating reference position marks, the spacing (L) to be set between the sound generator 23 and the light source 24 and the frequency f to be set at the sound generator 23 given a speed of sound c derive as:

$$L=n\times\lambda/2=n\times SB$$

and $$f=c/\lambda=c/2SB$$

Given the assumption that only the "free" wave nodes of the standing wave are used for generating the reference position marks, the spacing (L) to be set between the sound generator (23) and light source (24) and the frequency (f) to be set at the sound generator (23) given a speed of sound (c) derive as:

$$L=(n+1)\times\lambda/2=(n+1)\times SB$$

and $$f=c/\lambda=c/2SB$$

Given standard lane widths of SB=0.15 through 0.6 m, acoustic frequencies of f=1103 through 275 Hz then derive.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for positioning engraving elements in an electronic engraving machine for engraving printing cylinders for rotogravure, comprising the steps of:

respectively engraving in the form of cups at least two engraving lanes having predetermined lane widths lying side-by-side in an axial direction of the engraving cylinder with a respectively allocated engraving element;

setting axial spacings of the engraving elements relative to one another before the engraving;

executing with the engraving elements an axial feed motion along the printing cylinder during engraving; and for approximately setting the axial spacings of the engraving elements for the lane widths generating reference position marks for the engraving elements, the axial spacings of said marks from one another corresponding to the predetermined lane widths of the engraving lanes to be engraved on the printing cylinder;

providing the engraving elements with axial position marks; and axially shifting the engraving elements such that the axial position marks are in coincidence with the respectively allocated reference position marks.

2. The method according to claim 1 wherein the engraving elements are arranged displaceable and lockable on an engraving carriage;

the engraving elements are displaced on the engraving carriage for setting the spacings and are locked; and the engraving carriage with the locked engraving elements executes the feed motion along the printing cylinder when engraving the engraving lanes.

3. The method according to claim 1 wherein the position marks of the engraving elements respectively lie in a plane proceeding perpendicular to an axis of the printing cylinder and through an element of the engraving element that produces the cups.

4. The method according to claim 3 wherein the element that produces the cups is an engraving stylus.

5. The method according to claim 1 wherein the reference position marks coincide with axial engraving start positions in the engraving lanes on the printing cylinder.

6. The method according to claim 1 wherein after the setting of the spacings of the engraving elements, the engraving carriage is displaced such that the reference position marks coincide with axial engraving start positions in the engraving lanes on the printing cylinder.

7. The method according to claim 1 wherein an exact setting of the spacings is implemented after an approximate setting of the axial spacings of the engraving elements.

8. The method according to claim 1 wherein the reference position marks are automatically generated dependent on the number of engraving lanes to be engraved and on the predetermined lane widths.

9. A method for positioning engraving elements in an electronic engraving machine for engraving printing cylinders for rotogravure, comprising the steps of:

respectively engraving at least two engraving lanes each having a predetermined lane width lying side-by-side in an axial direction of the engraving cylinder with a respectively allocated engraving element;

setting an axial spacing of the at least two engraving elements relative to one another before the engraving;

executing with the engraving elements an axial feed motion along the printing cylinder during engraving; and for approximately setting the axial spacing of the engraving elements generating respective reference position marks for the engraving elements, the axial spacing of said marks from one another corresponding to the predetermined lane widths of the engraving lanes to be engraved on the printing cylinder;

providing the engraving elements with respective axial position marks; and axially shifting the engraving elements such that the position marks are in coincidence with the respectively allocated reference position marks.

10. An apparatus for positioning engraving elements in an electronic engraving machine for engraving printing cylinders for rotogravure, comprising:

a respectively allocated engraving element for engraving in the form of cups at least two engraving lanes having a predetermined lane width lying side-by-side in an axial direction of the engraving cylinder; and an apparatus for generating and displaying axial reference position marks whose axial spacings from one another correspond to predetermined lane widths of the engraving lanes comprising a transparent tube in which optically refractive particles are located, a sound generator arranged at one end face of the tube for generating a standing acoustic wave at wave nodes of which particles deposit, and a light source arranged at the other end face of the tube for generating light that makes the deposited particles visible as reference position marks, whereby the engraving elements are displaced such that axial position marks located at the engraving elements are in coincidence with the generated reference position marks.

11. The apparatus according to claim 10 wherein at least one of the sound generator and the light source are arranged axially displaceable in the tube.

12. The apparatus according to claim 10 wherein the particles are powder particles.

13. The apparatus according to claim 10 wherein the particles are mixed with a fluorescent substance and the light source generates ultraviolet light.

14. The apparatus according to claim 10 wherein a frequency of the sound generator is variable.

15. An apparatus for positioning engraving elements in an electronic engraving machine for engraving printing cylinders for rotogravure, comprising:

respectively allocated engraving elements for engraving at least two engraving lanes each having a predetermined lane width lying side-by-side in an axial direction of the engraving cylinder; and an apparatus for generating and displaying axial reference position marks whose axial spacings from one another correspond to the predetermined lane widths of the engraving lanes comprising a transparent tube in which optically refractive particles are located, a sound generator arranged at one end of the tube for generating a standing acoustic wave at wave nodes of which particles deposit, and a light source arranged at the other end of the tube for generating light that makes the deposited particles visible as the reference position marks so that the engraving elements can be displaced such that axial position marks located at the engraving elements are in coincidence with the generated reference position marks.

16. An engraving machine for engraving at least two engraving lanes of predetermined lane widths lying side-by-side, comprising:

a rotationally seated printing cylinder that is turned by a first drive;

an engraving carriage moveable in an axial direction along the printing cylinder by a second drive; and engraving elements for engraving the engraving lanes that are arranged displaceable and lockable on the engraving carriage; and an apparatus for automatically generating and displaying reference position marks for approximate setting of axial spacings of the engraving elements relative to the predetermined lane widths.

17. The engraving machine according to claim 16 wherein the apparatus is located on the engraving carriage and extends at least over a displacement region of the engraving elements.

18. The engraving machine of claim 16 wherein the apparatus for generating and displaying reference position marks is formed of the following components:

a transparent tube in which optically refractive particles are located;

a sound generator arranged at the one face end of the tube for generating a standing acoustic wave at wave nodes of which particles deposit; and a light source arranged at another end of the tube for generating light that makes the deposited particles visible as the reference position marks.

19. The engraving machine according to claim 16 wherein a frequency of the sound generator and a spacing between the sound generator and the light source are set such that a number of wave nodes of the standing acoustic wave is equal to a number of the engraving lanes to be engraved, and spacings of the wave nodes are equal to the predetermined lane widths.

20. An engraving machine for engraving at least two engraving lanes of respective predetermined lane widths lying side-by-side, comprising:

a rotationally seated printing cylinder that is turned by a first drive;

an engraving carriage moveable in an axial direction along the printing cylinder by a second drive;

engraving elements for engraving the engraving lanes arranged on the engraving carriage; and an apparatus for automatically generating and displaying reference position marks for approximate setting of an axial spacing of the engraving elements relative to the required lane widths, said apparatus comprising a tube having a sound generator and a light source so that deposited particles are visible as the reference position marks.

* * * * *

UNITED STATES PATENT AND TRADEMARK OFFICE

CERTIFICATE OF CORRECTION

PATENT NO. : 6,540,453 B1
DATED : April 1, 2003
INVENTOR(S) : Bernd Lubcke

It is certified that error appears in the above-identified patent and that said Letters Patent is hereby corrected as shown below:

Title page,
Item [73], Assignee, please correct "Hall Gravure Systems GmbH," to read
-- Hell Gravure Systems, GmbH --.

Signed and Sealed this

Seventh Day of October, 2003

JAMES E. ROGAN
*Director of the United States Patent and Trademark Office*